Patented Nov. 18, 1952

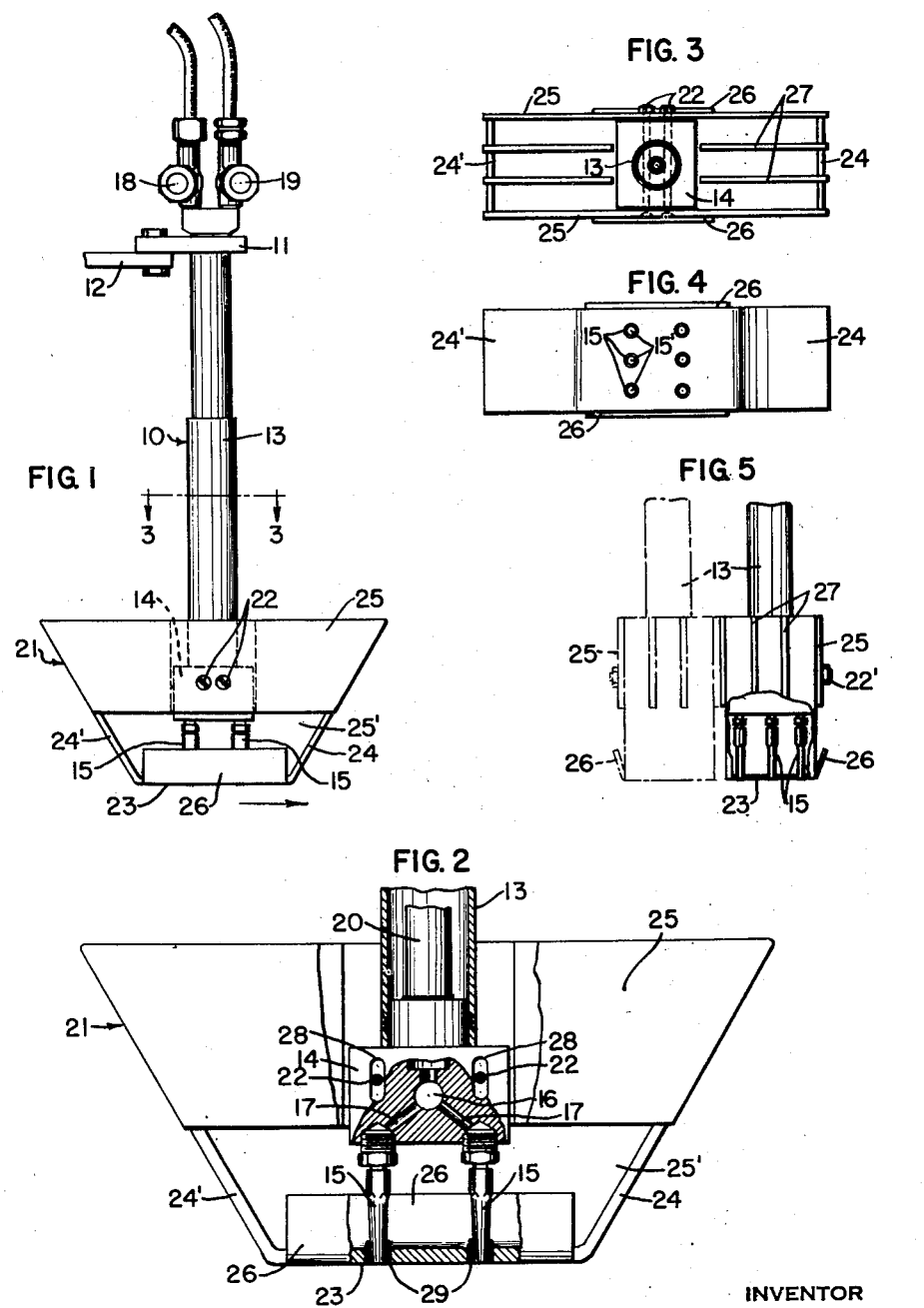

2,618,321

UNITED STATES PATENT OFFICE 2,618,321

AIR-COOLED GAS HEATING TORCH

George R. Spies, Jr., Berkley Heights, N. J., assignor to Air Reduction Company, Incorporated, a corporation of New York Application October 15, 1948, Serial No. 54,594

7 Claims. (Cl. 158—27.4)

This invention relates to gas heating torches or burners and especially those of relatively large capacity adapted to produce a multiplicity of heating flames for heating a relatively large area of a workpiece.

Heretofore it has been difficult to prevent torches of this type from overheating during their operation without resorting to the use of a liquid cooling medium such as water which is usually circulated through the heated portions of the torch, but it is frequently necessary to use such torches in locations, or under conditions, where no water or other cooling liquid is available or its use is not feasible. Moreover the use of a circulated cooling medium requires an adequate system of inter-connected passages or conduits in the torch structure which are usually troublesome due to leaks or stoppages which occur as a result of frequent handling or movement of the torch. While some large capacity air-cooled heating torches have been made, they have not been entirely satisfactory because it has been necessary to make them relatively massive and during operation they gradually accumulate heat and must be shut off at frequent intervals to permit them to cool.

The principal object of this invention is to provide an improved heating torch or burner of relatively large heating capacity which requires no provision for a circulated cooling medium and which, nevertheless, can be operated safely over extended periods of time without overheating.

Another object of the invention is to provide such a torch or burner which may have any desired size and shape and which may be made by fastening together a number of torch units of smaller size to form a composite torch of the desired capacity.

According to the invention the torch in its preferred form comprises a torch head, preferably in the form of a block, to which a number of downwardly extending individual heating tips or nozzles are connected, these being supplied with a combustible gas mixture through passages formed in the head. The heating flames are produced when the combustible gas mixture issuing from the ends of the tips or nozzles is ignited. A heat-dissipating shield or baffle is supported by the torch head and has a bottom portion provided with a number of openings which receive the ends of the tips, heat insulating material being employed to prevent metal-to-metal contact between the tips and the shield and to fill the spaces between the ends of the tips and the walls of the tip-receiving openings. The shield also has front and rear walls which extend upwardly from the bottom portion and form with a pair of side walls a hollow open-top rectangular structure which surrounds the torch head. Side openings in the lower portion of the shield permit the circulation of air through the interior of the shield, and a plurality of heat-dissipating fins extending inwardly from the front and rear walls of the shield toward the torch head are arranged for contact by the air circulating through the shield. The shield is made of a material that is a good heat conductor and is made sufficiently thick to provide for adequate conduction of the heat which it absorbs to the radiating surfaces for dissipation to the surrounding atmosphere.

A heating torch or burner embodying the invention is illustrated in the accompanying drawing, in which:

Figure 1 is a side elevation of the torch;

Fig. 2 is an enlarged side elevation of the lower portion of the torch shown in Fig. 1, some parts being shown in vertical section;

Fig. 3 is a horizontal section taken along line 3—3 of Fig. 1;

Fig. 4 is a bottom plan view of the torch shown in Fig. 1; and

Fig. 5 shows the lower portion of the torch of Fig. 1 partly in front elevation and partly in vertical section, and also shows, by broken lines, the manner in which a second similar torch may be associated with it to form a composite torch of larger capacity;

Referring to the drawing, the torch in its entirety is designated 10. It may be supported in any suitable way on a frame or carriage as by means of a lug 11 which is bolted or otherwise fastened to a part 12 of the carriage or frame.

The torch has an elongated barrel portion 13 which carries at its lower end a head 14 which is preferably in the form of a block. A number of downwardly extending individual torch tips or nozzles 15, each having a central passage 15' (Fig. 4), are secured to the head. The head is provided with a gas distributing chamber 16 (Fig. 2) which supplies the central passages of the tips with gas by means of branch passages 17. Oxygen and a fuel gas such as acetylene are supplied separately to the torch through valves 18 and 19 respectively at the upper end of the barrel portion 13. The gases are delivered through conduits (not shown) within the barrel portion to a conventional mixing device, indicated at 20 (Fig. 2), in which they are mixed and fed to the distributing chamber 16 in the head 14.

A shield or baffle 21 is secured to the head 14 by means of bolts 22. The shield is preferably shaped as shown in the drawing, or in a similar manner, to protect substantially all of the lower portion of the torch, especially the block 14 and tips 15, from the flame wash and heated gases produced by the flames and the heat radiated from the flames and the heated workpiece.

The shield 21 is preferably made of copper or some other material which is a good heat conductor and is constructed in such a manner as not to add too much weight to the torch. To this end, the shield is preferably formed by producing from a single strip of metal a channel-shaped member having a bottom portion 23 and upwardly and outwardly inclined front and rear walls 24 and 24' (Figs. 1 and 2). The walls 24 and 24' are interconnected at each side of the shield by a side wall 25 which is silver-soldered or otherwise secured at its opposite ends to the corresponding edge faces of the front and rear walls 24 and 24'. The side walls 25 do not extend all of the way down to the bottom portion 23 of the shield, thereby leaving side openings 25' in the lower portion of the shield. The bottom portion 23 of the shield is provided along its side edges with upwardly extending outwardly inclined flanges or lips 26. At spaced intervals intermediate the side walls 25 the inclined walls 24 and 24' of the shield are slotted to receive the outer ends of plates or fins 27 (Figs. 3 and 5) which extend inwardly toward the block 14. These fins may be silver-soldered in the slots or secured therein in any other suitable way. The bottom portion 23 of the shield has a number of holes drilled therein to receive the lower ends of the tips 15. The tips may be of any desired number and arranged in any suitable way, a typical arrangement being two parallel rows of tips extending from one side of the head to the other with three tips in each row as shown in Fig. 4. Whatever arrangement of tips is utilized it should be such that the heating flames are distributed uniformly over the work area being heated at any instant by the torch.

Vertical slots 28 in the head 14 (Fig. 2), through which the fastening bolts 22 pass, permit the shield to be adjusted vertically on the head so that tips of various lengths may be used and the lower face of the bottom portion 23 of the shield always kept substantially flush with the end or discharge faces of the tips. The portion of each tip that passes through one of the holes in the bottom portion 23 of the shield is surrounded by a ring of suitable heat insulating material 29 (Fig. 2) such as asbestos, fiber glass, or the like. Preferably each ring of insulating material comprises a fiber glass sleeve that may be slid over the end of a tip with asbestos wicking stuffed under it to make it thicker so that it will fit tightly in the opening in the shield when the end of the tip with its insulating ring is inserted through the opening.

The tips themselves are preferably small in diameter so that they offer as little exposed area as possible through which heat may be absorbed by them, and the total area of the exposed ends of the tips should be relatively small in comparison to the area of the lower face of the bottom portion 23 of the shield. Thus only a small amount of heat is absorbed by the tips themselves from the flames, the hot gases, and the hot workpiece, most of it being absorbed by the bottom portion 23 of the shield. The heat insulating material 29 seals the spaces between the ends of the tips and the shield openings into which they project, thereby preventing heat from passing upwardly around the tips. It also prevents metal-to-metal contact between the shield and the ends of the tips which would otherwise cause heat to be conducted from the heated shield directly to the tips. Thus if it were not for the heat insulating material, continuous operation of the torch might cause an undesirable accumulation of heat in the tips either because of their contact with the shield, or because of the heat passing through the clearances around the ends of the tips, or both.

The under side of the torch head is protected from the heat radiated directly from the hot workpiece by the bottom portion 23 of the shield. The heat picked up by this bottom portion of the shield is conducted through the inclined front and rear walls 24 and 24' to the side walls 25 and the fins 27 and is radiated from these parts to the surrounding atmosphere. The front and rear walls 24 and 24' together with the side walls 25 form an open-top rectangular structure which surrounds the torch head and the mixer 20 and protects them from the flame wash and hot gases. An additional cooling effect is achieved by means of air convection through the open top of the structure and the side openings 25'. The upwardly extending and outwardly inclined flanges 26 at the sides of the bottom portion 23 deflect the hot gases outwardly and prevent them from entering the interior of the shield through the openings 25' and thereby heating the torch tips.

While the front and rear walls 24 and 24' of the shield could, if desired, be at right angles to the bottom portion 23, they are preferably inclined outwardly as above described because they then serve to deflect the hot gases outwardly and also make it possible to use longer heat dissipating fins in the upper portion of the shield without making the bottom portion 23 of the shield too long, for this would increase the area of this portion of the shield which is closest to the work and which is at right angles to the heat radiated from the work, thereby increasing the amount of heat that the shield would be called upon to handle and dissipate. It should be understood that the channel-shaped portion of the shield comprising the bottom 23 and the front and rear walls 24 and 24' is sufficiently thick to form a good heat-conducting path to the side walls 25 and the fins 27 which help dissipate the heat. The entire shield is so designed that the heat of the flame treating operation is absorbed by the shield rather than by the torch head and tips and at such a rate that the torch will never become overheated and can, therefore, operate over extended periods of time. If it were not for the shield the heat to which the torch is subjected would probably damage the torch structure and also affect the constituent gases of the gas mixture so as to form a less stable mixture that is more likely to cause backfires.

A composite torch of any desired heating capacity may be formed by positioning two or more torches of the kind above described side by side and bolting them together in the manner illustrated in Fig. 5. The above-described bolts 22 in this case would be made longer, as shown at 22' in Fig. 5, so that they serve not only to attach each shield to the corresponding torch head but also serve to clamp the torch heads together. Also, when torches of the kind previously described are fastened together in this manner to produce a composite torch of larger capacity the upturned lips or flanges 26 at the meeting sides of the shields are omitted.

In the foregoing description the walls 24 and 24' have been referred to as front and rear walls, and the walls 25 as side walls, because it has been assumed that the relative movement between the torch and the workpiece is in the direction of the arrow in Fig. 1, but it should be understood that the walls 24 and 24' may be considered as side walls and the walls 25 as front and rear walls. Also, the other terms of orientation used in the description apply to the torch when it is in a vertical position as shown in the drawing, but it should be understood that it can be used in other positions.

I claim:

1. A gas heating torch comprising a head, a plurality of tips secured to and projecting downwardly from the head, means for delivering heating gases to the head, the head having passages for conducting the heating gases to the tips, a heat-dissipating shield secured to the head having a bottom portion provided with tip-receiving openings into which the ends of the torch tips project, the torch tips projecting no farther downwardly than the lower face of the bottom of the shield, said shield also having a pair of walls extending upwardly from the bottom portion and straddling the head, heat insulating material filling the space between the end of each tip and the wall of the tip-receiving opening into which it projects, and heat dissipating fins projecting from said walls and located over a portion of the bottom of the shield.

2. A gas heating torch comprising a head, a plurality of tips secured to and projecting downwardly from the head, means for delivering heating gases to the head, the head having passages for conducting the heating gases to the tips, and a heat-dissipating shield secured to the head, said shield having a bottom portion provided with tip-receiving openings into which the ends of the torch tips project and also having front and rear walls extending upwardly and outwardly from said bottom portion and straddling the head, the shield further having side walls forming with the front and rear walls a hollow open-top rectangular structure which surrounds the torch head, a plurality of heat-dissipating fins extending inwardly from the front and rear walls of the shield toward the torch head, and heat insulating material filling the space between the end of each tip and the wall of the tip-receiving opening into which it projects.

3. A gas heating torch in accordance with claim 2 in which the side walls of the shield and the heat-dissipating fins extend downwardly only approximately to the tips, and in which said bottom portion of the shield has side flanges which extend upwardly toward said side walls and are inclined outwardly.

4. A gas heating torch in accordance with claim 1 in which the discharge faces of the torch tips are substantially flush with the lower face of the bottom portion of the shield, and the total area of the discharge faces of the tips is substantially less than the area of said lower face of the bottom of the shield, and there being adjustable means for attaching the shield to the torch head that permits vertical adjustment of the shield on the head.

5. A gas heating torch comprising a head, a plurality of tips secured to and projecting downwardly from the head, means for delivering heating gases to the head, the head having passages for conducting the heating gases to the tips, a heat-dissipating shield secured to the head having a bottom portion provided with tip-receiving openings into which the ends of the torch tips project, the torch tips projecting no farther downwardly than the lower face of the bottom of the shield, said shield also having four walls forming a hollow open-top rectangular structure surrounding the torch head, heat insulating material filling the space between the end of each tip and the wall of the tip-receiving opening into which it projects, and heat dissipating fins projecting inwardly from said rectangular structure, the shield having at least one air-inlet opening above the bottom portion of the shield and below said fins to permit natural air convection into the rectangular structure and then upwardly past the fins and out of the open top of the rectangular structure.

6. A torch in accordance with claim 5 in which the bottom portion of the shield has an inclined deflector extending upwardly and outwardly from beneath each air inlet opening beyond the confines of said walls and in substantially opposed relationship to said opening to deflect outwardly the hot gases produced by the burner flames and prevent them from entering the interior of the shield.

7. A gas heating torch comprising a head, a plurality of tips secured to and projecting downwardly from the head, means for delivering heating gases to the head, the head having passages for conducting the heating gases to the tips, and a heat-dissipating shield secured to the head, said shield having a bottom portion provided with tip-receiving openings into which the ends of the torch tips project and also having front and rear walls extending upwardly from said bottom portion and straddling the head, the shield further having side walls forming with the front and rear walls a hollow open-top rectangular structure which surrounds the torch head, a plurality of heat-dissipating fins extending inwardly from the front and rear walls of the shield toward the torch head, and heat insulating material filling the space between the end of each tip and the wall of the tip-receiving opening into which it projects.

GEORGE R. SPIES, Jr.

REFERENCES CITED

The following references are of record in the file of this patent:

UNITED STATES PATENTS

| Number | Name | Date |
| --- | --- | --- |
| 804,002 | Fouche | Nov. 7, 1905 |
| 850,581 | Hopkins | Apr. 16, 1907 |
| 1,081,035 | Geyer | Dec. 9, 1913 |
| 1,230,204 | Nash | June 19, 1917 |
| 1,373,043 | Amberg | Mar. 29, 1921 |
| 1,662,115 | Johnson | Mar. 13, 1928 |
| 1,675,668 | Smith | July 3, 1928 |
| 1,865,904 | Hammon | July 5, 1932 |
| 2,034,041 | Kuenhold | Mar. 17, 1936 |
| 2,130,261 | Buckman | Sept. 13, 1938 |
| 2,181,937 | Eskridge | Dec. 5, 1939 |
| 2,435,638 | Shorter | Feb. 10, 1948 |

FOREIGN PATENTS

| Number | Country | Date |
| --- | --- | --- |
| 198,801 | Great Britain | June 14, 1923 |
| 251,091 | Great Britain | Apr. 29, 1926 |